(12) United States Patent
Williams

(10) Patent No.: US 9,284,994 B2
(45) Date of Patent: Mar. 15, 2016

(54) CLUTCH MECHANISM AND DECOUPLER DEVICE WITH SAME

(75) Inventor: Warren J. Williams, Oakville (CA)

(73) Assignee: LITENS AUTOMOTIVE PARTNERSHIP, Woodbridge, Ontario (CA)

(*) Notice: Subject to any disclaimer, the term of this patent is extended or adjusted under 35 U.S.C. 154(b) by 121 days.

(21) Appl. No.: 14/009,829

(22) PCT Filed: Apr. 2, 2012

(86) PCT No.: PCT/CA2012/000331
§ 371 (c)(1),
(2), (4) Date: Nov. 15, 2013

(87) PCT Pub. No.: WO2012/135942
PCT Pub. Date: Oct. 11, 2012

(65) Prior Publication Data
US 2014/0076683 A1    Mar. 20, 2014

Related U.S. Application Data

(60) Provisional application No. 61/471,222, filed on Apr. 4, 2011.

(51) Int. Cl.
*F16D 47/04* (2006.01)
*F16D 27/10* (2006.01)
(Continued)

(52) U.S. Cl.
CPC .............. *F16D 27/025* (2013.01); *B60K 25/02* (2013.01); *F02B 67/06* (2013.01); *F16D 13/12* (2013.01); *F16D 13/76* (2013.01); *F16D 27/105* (2013.01); *F16D 41/206* (2013.01)

(58) Field of Classification Search
CPC ....... F16D 41/06; F16D 41/08; F16D 41/084; F16D 27/025; F16D 13/76; F16D 27/105; F16D 13/12
See application file for complete search history.

(56) References Cited

U.S. PATENT DOCUMENTS 3,019,871 A    2/1962  Sauzedde
3,812,936 A    5/1974  Dane
(Continued)

FOREIGN PATENT DOCUMENTS

DE    102011085138 A1    6/2012
WO       9316585 A1    2/1993
(Continued)

OTHER PUBLICATIONS

PCT/CA2012/000331, Search Report, Jul. 11, 2012.
(Continued)

*Primary Examiner* — Rodney H Bonck
*Assistant Examiner* — Lillian Nguyen
(74) *Attorney, Agent, or Firm* — Millman IP Inc.

(57) ABSTRACT

A clutched device that includes a pulley, a shaft member, a first one-way clutch having a first wrap spring, and an actuator having an electromagnetic coil and an armature. The first one-way clutch rotationally couples the pulley and the shaft member when the actuator is actuated and rotary power is transmitted from a first one of the pulley and the shaft member to the other one of the pulley and the shaft member in a first rotational direction. A frictional force is applied to the armature when the actuator is activated. The frictional force is configured to resist rotation of the armature to cause the first wrap spring to radially expand into driving engagement with a clutch surface that is coupled to the pulley for common rotation.

12 Claims, 10 Drawing Sheets

(51) Int. Cl.
  *F16D 27/02* (2006.01)
  *B60K 25/02* (2006.01)
  *F02B 67/06* (2006.01)
  *F16D 13/12* (2006.01)
  *F16D 13/76* (2006.01)
  *F16D 27/105* (2006.01)
  *F16D 41/20* (2006.01)

(56) References Cited

U.S. PATENT DOCUMENTS

| | | | |
|---|---|---|---|
| 3,865,222 A * | 2/1975 | Briar | 192/55.1 |
| 4,570,758 A | 2/1986 | Hendricks | |
| 4,690,390 A | 9/1987 | Kish | |
| 4,867,291 A | 9/1989 | Holman et al. | |
| 4,934,499 A | 6/1990 | Kish | |
| 5,085,306 A | 2/1992 | Beigang | |
| 5,275,261 A | 1/1994 | Vranish | |
| 5,517,957 A | 5/1996 | Wagner et al. | |
| 5,638,931 A | 6/1997 | Kerr | |
| 5,799,931 A | 9/1998 | Kish | |
| 6,083,130 A | 7/2000 | Mevissen et al. | |
| 6,582,333 B2 | 6/2003 | Man et al. | |
| 6,698,563 B2 | 3/2004 | Handa et al. | |
| 6,755,763 B1 | 6/2004 | Goto et al. | |
| 6,766,888 B2 | 7/2004 | Yasui et al. | |
| 6,832,970 B2 | 12/2004 | Eibler | |
| 6,871,735 B2 | 3/2005 | Kawai et al. | |
| 6,955,141 B2 | 10/2005 | Santanam et al. | |
| 7,114,585 B2 | 10/2006 | Man et al. | |
| 7,543,454 B2 | 6/2009 | Harris | |
| 7,591,357 B2 | 9/2009 | Antchak et al. | |
| 7,618,337 B2 | 11/2009 | Jansen et al. | |
| 7,624,852 B2 | 12/2009 | Mevissen et al. | |
| 7,654,375 B2 | 2/2010 | Okada et al. | |
| 8,166,945 B2 | 5/2012 | Spicer et al. | |
| 8,454,463 B2 | 6/2013 | Parsons | |
| 8,460,152 B2 | 6/2013 | Parsons et al. | |
| 8,534,438 B2 | 9/2013 | Antchak et al. | |
| 8,627,935 B2 | 1/2014 | Danciu et al. | |
| 2003/0005784 A1 | 1/2003 | Schnelle et al. | |
| 2007/0267264 A1 | 11/2007 | Pederson | |
| 2008/0020875 A1 | 1/2008 | Serrels et al. | |
| 2008/0045374 A1 | 2/2008 | Weinberg et al. | |
| 2008/0276892 A1 | 11/2008 | Doljack | |
| 2008/0312014 A1 | 12/2008 | Stief et al. | |
| 2009/0212626 A1 | 8/2009 | Snyder et al. | |
| 2010/0006500 A1 | 1/2010 | Cantwell et al. | |
| 2010/0122882 A1 | 5/2010 | Komorowski et al. | |
| 2010/0230227 A1 | 9/2010 | Parsons et al. | |
| 2011/0112742 A1 | 5/2011 | Losano et al. | |

FOREIGN PATENT DOCUMENTS

| | | | |
|---|---|---|---|
| WO | 03/104673 | A1 | 12/2003 |
| WO | 2009118834 | A1 | 3/2008 |
| WO | 2008150349 | A1 | 12/2008 |
| WO | 2010048732 | A1 | 5/2010 |
| WO | 2010054487 | A1 | 5/2010 |
| WO | 2010099605 | A1 | 9/2010 |
| WO | 2011017811 | A1 | 2/2011 |
| WO | 2012135942 | A1 | 10/2012 |

OTHER PUBLICATIONS

"Means Industries MD Clutches" (Means Industries Info Sheet), Means Industries, 2006.
"Mechanical Diode (MD)—One Way Clutch" (Means Industries Info Sheet), Means Industries, 1998.
"Basic 3 Types of One Way Clutches (OWC)" (Means Industries Info Sheet), Means Industries, 2009.
MD Clutches Info Sheet, Means Industries, 2001.
"Bi-Directional Controllable MD" (Means Industries Info Sheet), Means Industries, 2001.
"MD with Inward Rotating Strut Stationary Pocket Plate" (Means Industries Info Sheet), Means Industries, 2001.
"Rotating Strut Type—MD" (Means Industries Info Sheet), Means Industries, 2001.
"MD with Outward Rotating Strut Disengages with Centrifugal Force" (Means Industries Info Sheet), Means Industries, 2001.
"Roller Locking Mechanism Contains Two Overrunning Clutches", Vranish, John M., Mechanisms and Mechanical Devices Sourcebook (Fourth Edition), McGraw-Hill 2007 (p. 227).
"Mechanical Diode Clutch—Ford 5R110 Power Shift Transmission", Means Industries, Date Unknown.
"Bi-Directional/One Way Clutch Systems", Brochure, Ker-Train Research, Date Unknown.
Ker-Train Company Brochure D36183, Ker-Train Research, Date Unknown.
"Ultracapacitor Assisted Electric Devices for Transportation", 2003, Miller er al. (Maxwell Technologies).
Written Opinion for PCT/CA2012/000331, Jul. 11, 2012, ISA.
International Preliminary Report on Patentability, Jul. 11, 2012, ISA.

* cited by examiner

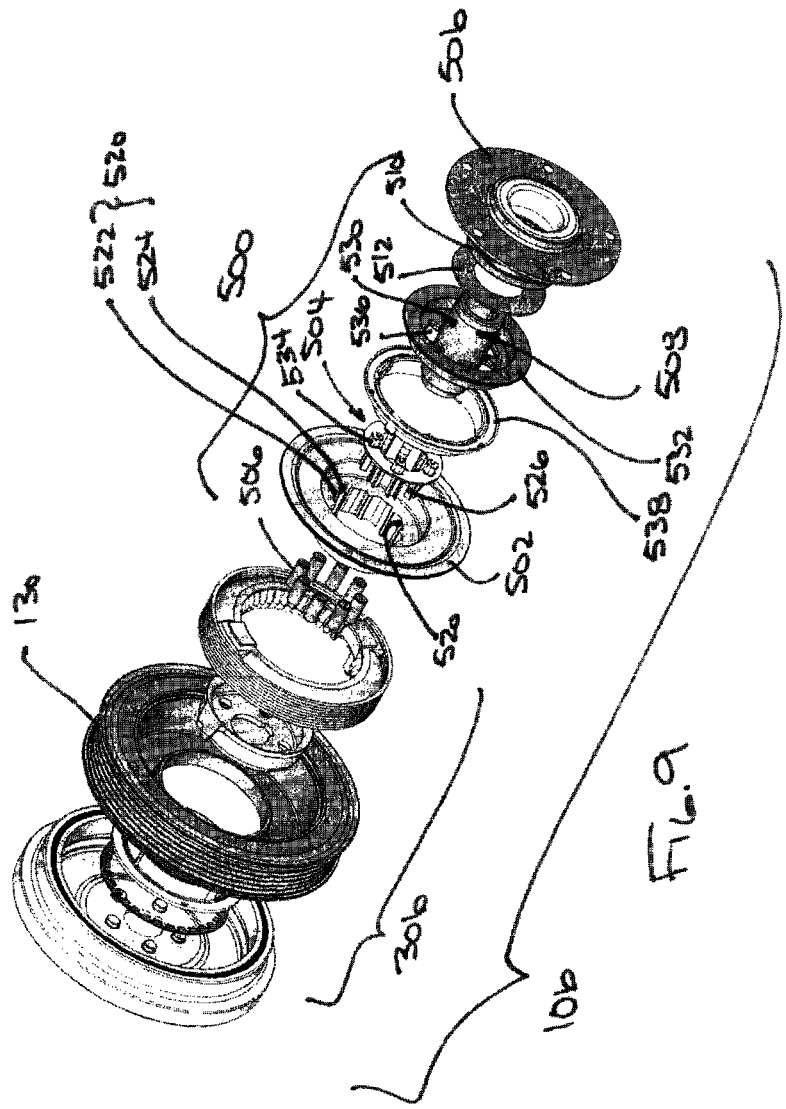

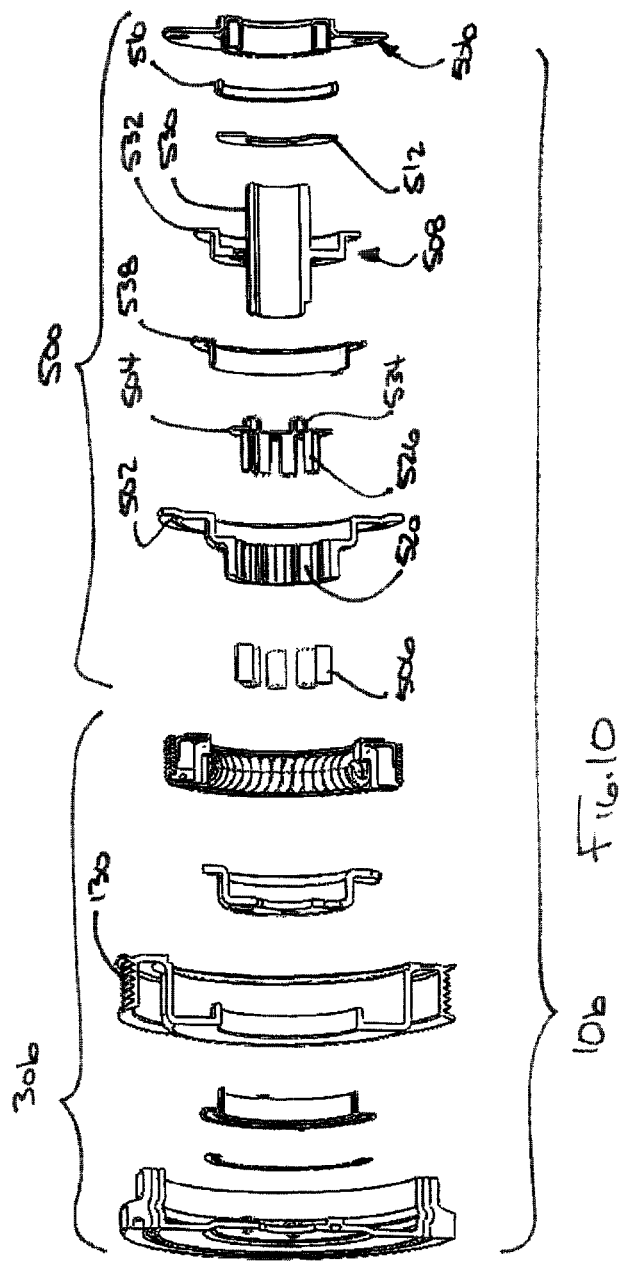

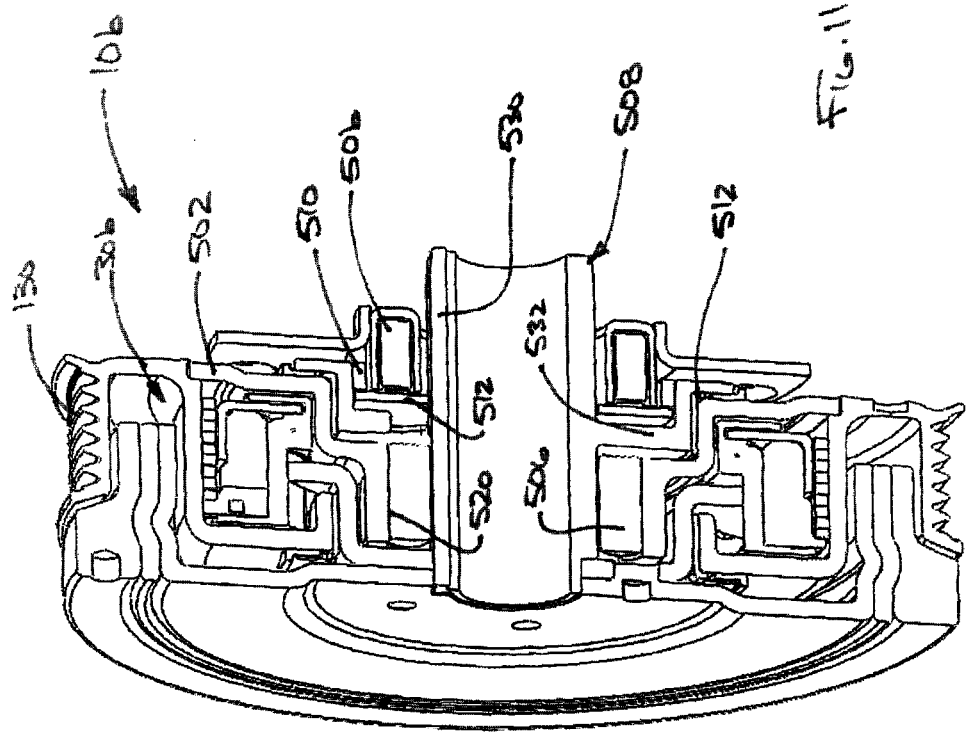

CLUTCH MECHANISM AND DECOUPLER DEVICE WITH SAME

CROSS-REFERENCE TO RELATED APPLICATIONS

This application claims the benefit and priority of U.S. Provisional Patent Application No. 61/471,222, filed Apr. 4, 2011, the entire disclosure of which is incorporated herein by reference.

FIELD

The present disclosure generally relates to a clutch mechanism and to a decoupler device with a clutch mechanism.

BACKGROUND

This section provides background information related to the present disclosure which is not necessarily prior art.

Serpentine accessory drive systems for automotive vehicles are commonly used to transfer power, via associated pulleys, from an internal combustion engine crankshaft to accessory components such as alternators, water pumps, power steering pumps, and air conditioning compressors. Under operating conditions where the crankshaft slows suddenly, high-inertia components of the accessory drive will tend to load the serpentine belt such that the belt may squeal or slip, and/or vibrate, and/or cause the tensioner and/or accessory components to vibrate.

It is known to counter this effect with an over-running decoupler, which may be positioned on one of the high-inertia components or on the engine crankshaft. Examples of such devices are disclosed in U.S. Pat. Nos. 7,618,337; 7,591,357 and 7,624,852. While such devices are well suited for their intended purpose, we have noted that it would be desirable to lock, bypass or otherwise transmit rotary power through the over-running decoupler in some situations. One such situation involves a BAS (i.e., "belt-alternator-starter") system in which a belt-driven alternator may be operated as a starter motor that will provide rotary power to the serpentine belt for rotating the crankshaft during starting of the internal combustion engine.

An overrunning-enabled automotive starter generator is disclosed in International Publication No. WO 03/104673 (International Application No. PCT/CA03/00852) published Dec. 18, 2003. While such device is suited for its intended purpose, there remains a need in the art for an improved clutched device.

SUMMARY

This section provides a general summary of the disclosure, and is not a comprehensive disclosure of its full scope or all of its features.

In one form, the present teachings provide a clutched device that includes a pulley, a shaft member, a first one-way clutch having a first wrap spring, and an actuator having an electromagnetic coil and an armature. The first one-way clutch rotationally couples the pulley and the shaft member when the actuator is actuated and rotary power is transmitted from a first one of the pulley and the shaft member to the other one of the pulley and the shaft member in a first rotational direction. A frictional force is applied to the armature when the actuator is activated. The frictional force is configured to resist rotation of the armature to cause the first wrap spring to radially expand into driving engagement with a clutch surface that is coupled to the pulley for common rotation.

In another form, the present teachings provide a clutched device that includes a housing, a shaft member, a pulley, an over-running decoupler, a one-way clutch, and an actuator. The over-running decoupler rotationally couples the shaft member and the pulley when rotary power is transmitted from one of the shaft member and the pulley to the other one of the shaft member and the pulley in the first rotational direction. The over-running decoupler does not transmit rotary power between the shaft member and the pulley when the other one of the shaft member and the pulley overruns the one of the shaft member and the pulley in the first rotational direction. The one-way clutch has a wrap spring. The actuator is configured to control operation of the one-way clutch and includes an armature. The one-way clutch rotationally couples the pulley and the shaft member when the actuator is actuated and rotary power is transmitted from the first one of the shaft member and the pulley to the other one of the shaft member and the pulley in the first rotational direction. A frictional force is applied to the armature when the actuator is activated. The frictional force is configured to resist but not inhibit rotation of the armature relative to the housing to cause the first wrap spring to radially expand into driving engagement with a clutch surface that is coupled to the pulley for common rotation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 is an exploded perspective view of a third exemplary clutch controlled decoupler constructed in accordance with the teachings of the present disclosure;

FIG. 10 is an exploded perspective section view of the clutch controlled decoupler of FIG. 9; and FIG. 11 is a longitudinal section view of the clutch controlled decoupler of FIG. 9.

DETAILED DESCRIPTION

Figure 1:
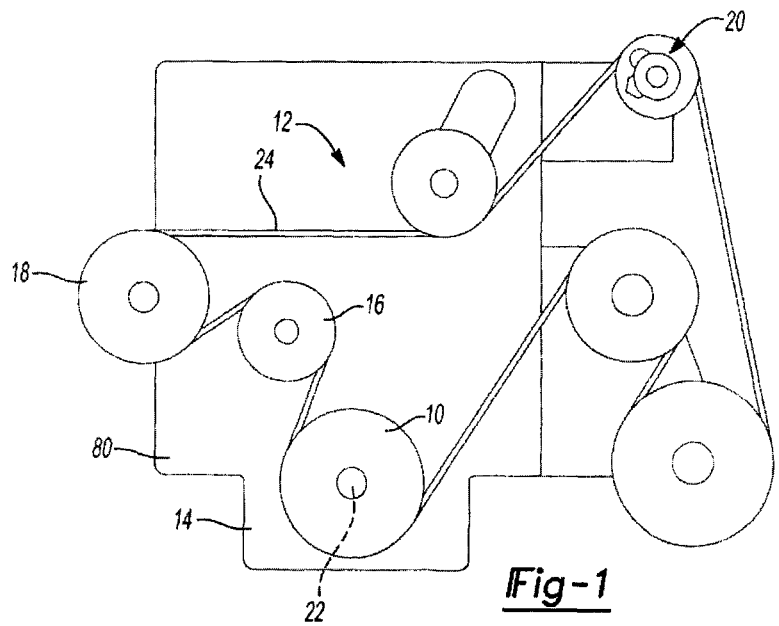
FIG. 1 is a schematic illustration of a first exemplary clutch controlled decoupler constructed in accordance with the teachings of the present disclosure and shown in operative association with an internal combustion engine.

With reference to FIG. 1 of the drawings, a first clutch controlled decoupler constructed in accordance with the teachings of the present disclosure is generally indicated by reference numeral 10. The clutch controlled decoupler 10 can be employed in a front engine accessory drive 12 of an internal combustion engine 14. The front engine accessory drive 12 can include a plurality of engine accessories, such as a water pump 16, an air conditioning compressor 18 and a starter/generator or starter/alternator 20 that can be driven by the crankshaft 22 of the engine 14 via a belt 24 and the clutch controlled decoupler 10. Those of ordinary skill in the art will appreciate that the particular example provided pertains to a BAS (belt-alternator-starter) system because the front engine accessory drive 12 includes a starter/generator. It will be appreciated, however, that the BAS system could be equipped to additionally provide an idle-stop-accessory function in which the starter/generator is operated as an electric motor to input rotary power to (i.e., drive) the belt 24 of the front engine accessory drive 12 when the crankshaft 22 is not being driven by the engine 14. As those of skill in the art will understand, the idle-stop-accessory function permits various accessories, such as the water pump 16 and the air conditioning compressor 18 to be operated when the engine 14 is not being operated.

Figure 2:
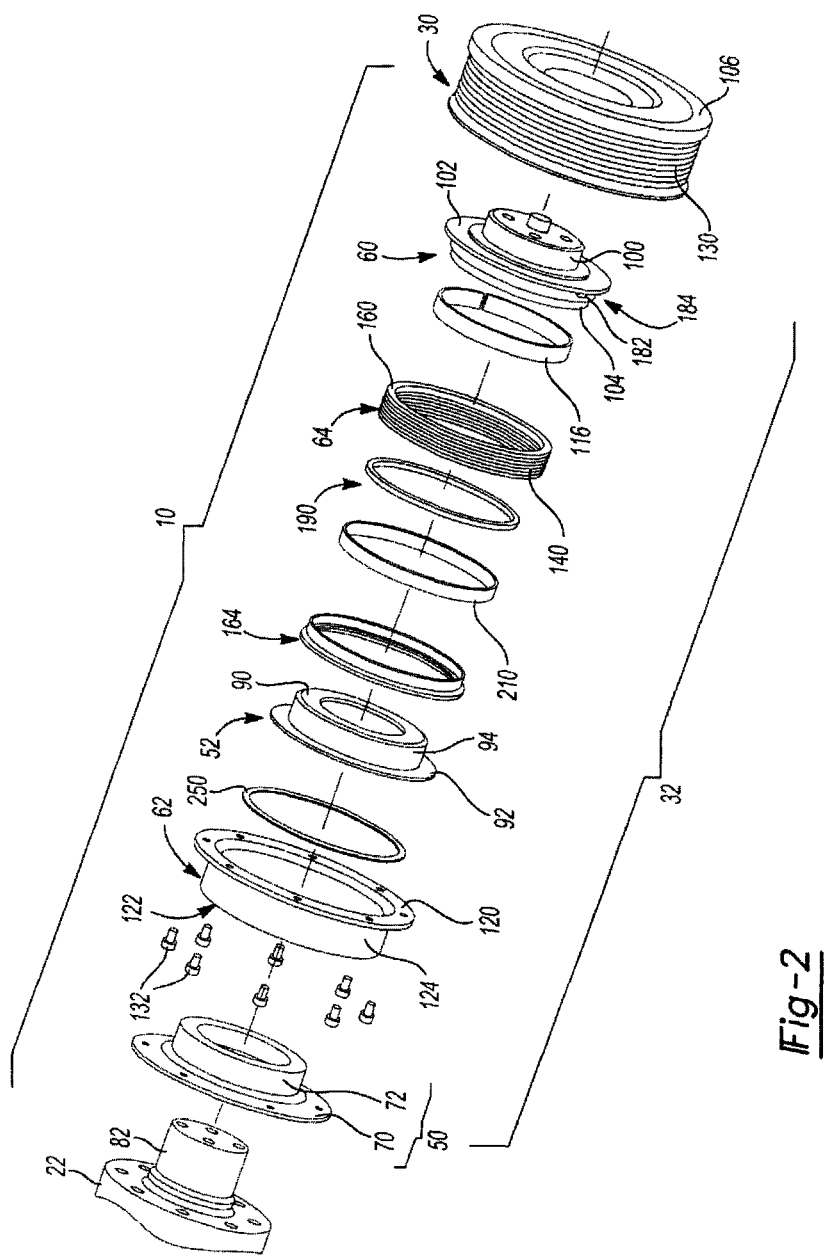
FIG. 2 is an exploded perspective view of the clutch controlled decoupler of FIG. 1.
Figure 3:
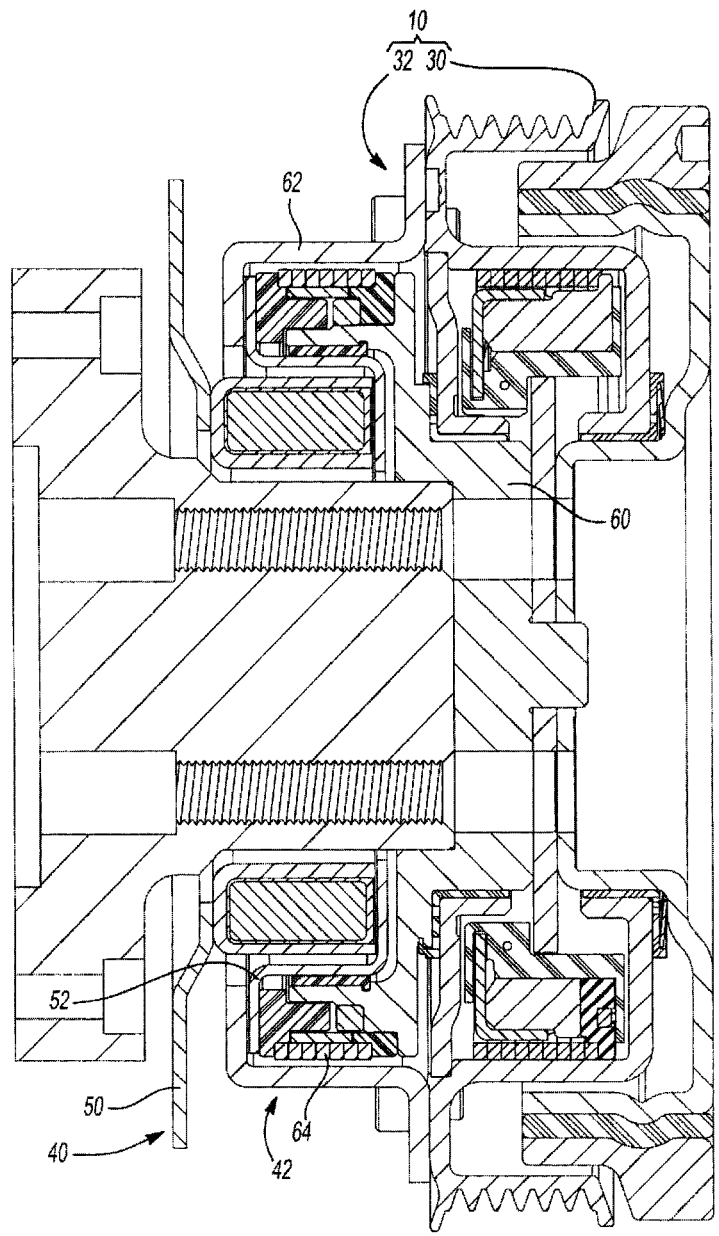
FIG. 3 is a perspective longitudinal section view of the clutch controlled decoupler of FIG. 1.
Figure 4:
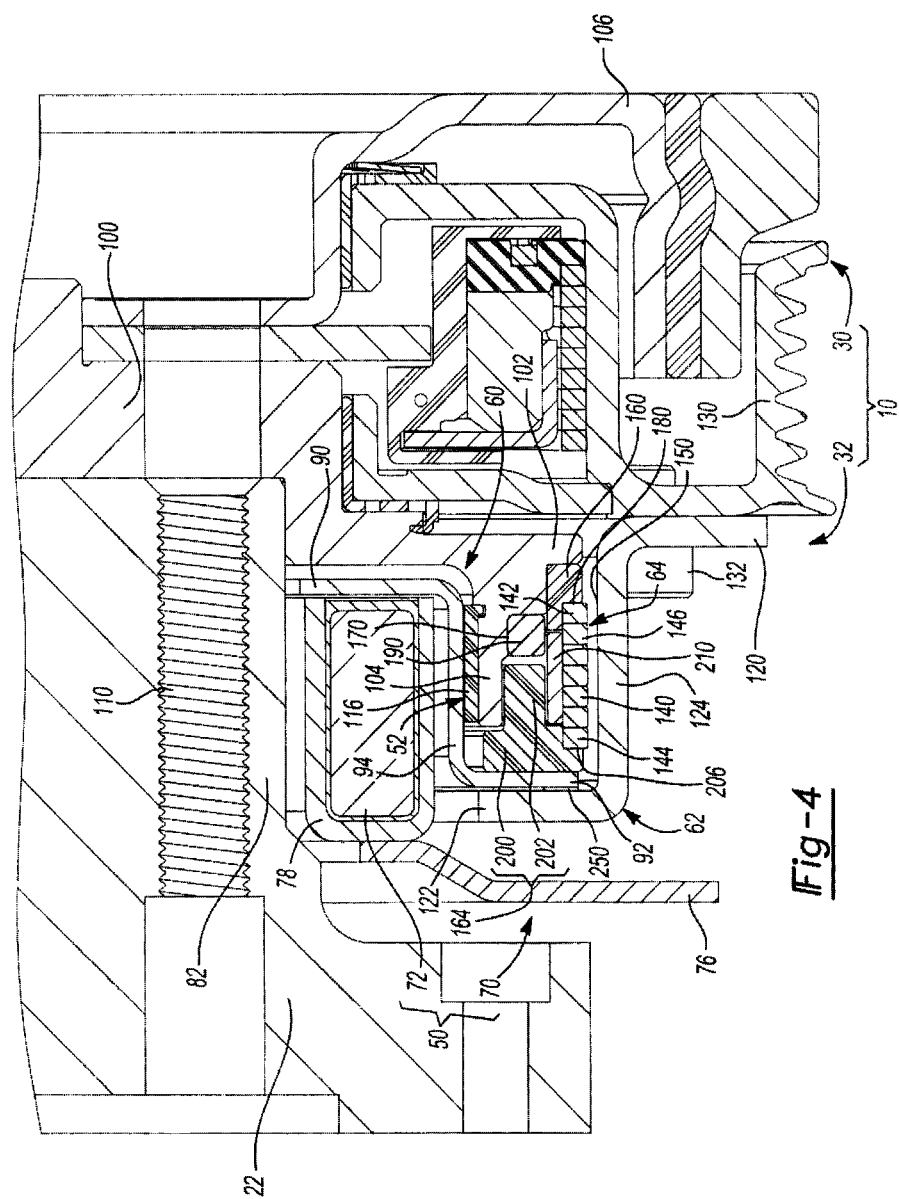
FIG. 4 is an enlarged portion of FIG. 3.

With reference to FIGS. 2 through 4, the clutch controlled decoupler 10 can comprise a decouper 30 and a clutching unit 32. Except as described herein, the decoupler 30, which can also be considered to be a one-way clutch, can be generally similar to the decoupler disclosed in International Patent Application No. PCT/CA2010/000296, but it will be appreciated that the decoupler 30 could be similar to any other suitable decoupler, including that which is described in U.S. Pat. No. 7,624,852. The disclosures of the aforementioned patent application and patent are incorporated by reference as if fully set forth in detail herein.

The clutching unit 32 can comprise an actuator 40 and a clutch assembly 42. The actuator 40 can comprise a coil assembly 50 and an armature 52, while the clutch assembly 42 can include an output member or shaft member 60, an input member or hub 62, and a clutch element 64.

With specific reference to FIGS. 2 and 4, the coil assembly 50 can comprise a coil mount 70 and an annular coil 72. The coil mount 70 can comprise an annular flange 76 and an annular coil housing 78 that can be fixedly coupled to and extend from the annular flange 76. The annular flange 76 can be adapted to be fixedly coupled to the front cover 80 (FIG. 1) of the engine 14 (FIG. 1) such that a front hub 82 of the crankshaft 22 can extend therethrough. The coil 72 can be received in the coil housing 78 and can be positioned radially outwardly from the front hub 82 of the crankshaft 22.

The armature 52 can be formed of a magnetically susceptible material, such as steel, and comprise a pole member 90, an input flange 92 and an annular spacing member 94 that can extend axially and concentrically about the coil 72. The pole member 90 can be coupled to a first end of the spacing member 94 and can extend radially outwardly therefrom so as to be positioned axially in-line with the coil 72. The input flange 92 can be coupled to a second, opposite end of the spacing member 94 and can extend radially inwardly therefrom.

The shaft member 60 of the clutch assembly 42 can be fixedly coupled to the front hub 82 of the crankshaft 22 and can be coupled to or form an input member of the decoupler 30 (i.e., the hub spacer identified by reference numeral 30 in International Patent Application No. PCT/CA2010/000296). In the particular example provided, the shaft member 60 of the clutch assembly 42 is integrally formed with the hub spacer 100 of the decoupler 30 and comprises an annular flange 102 that is coupled to a rear side of the hub spacer 100 and an annular wall member 104 that extends rearwardly from the annular flange 102. Threaded fasteners (not shown) can be received through the torsional vibration damper 106 and hub spacer 100 of the decoupler, and the hub 62, and can be threadably engaged to holes 110 in the crankshaft 22 to fixedly couple both the torsional vibration damper 106 and the shaft member 60 to the crankshaft 22. The annular wall member 104 can be disposed radially outwardly of the spacing member 94 of the armature 52. A first bearing element 116 can be disposed between the spacing member 94 on the armature 52 and the annular wall member 104. The first bearing element 116 can be configured to help maintain the armature 52 in an orientation that is disposed concentrically about the rotational axis of the crankshaft 22, and/or to provide a lower friction surface on which the armature 52 may be translated.

The hub 62 can comprise a mounting flange 120, an output flange 122, and a coupling member 124 that can extend axially and concentrically about the armature 52 and the annular flange 102. The mounting flange 120 can be coupled to a first end of the coupling member 124 and can extend radially outwardly therefrom. The mounting flange 120 can be coupled to the pulley 130 of the decoupler 30 for rotation therewith. Any desired means may be employed for retaining the mounting flange 120 to the pulley 130, including welds, threaded fasteners 132 and/or rivets. In some situations, it may be possible to integrally form some or all of the hub 62 with the pulley 130. The output flange 122 can be coupled to a second, opposite end of the coupling member 124 and can extend radially inwardly therefrom so as to be positioned axially in-line with the input flange 92 of the armature 52.

The clutch element 64 can be configured to transmit rotary power from the hub 62 to the shaft member 60 and to inhibit the transmission of rotary power from the shaft member 60 to the hub 62 (i.e., the clutch element 64 can be configured to permit the transmission of rotary power between the hub 62 and the shaft member 60 in a first rotational direction and to inhibit the transmission of rotary power between the hub and the shaft member 60 in a second, opposite rotary direction). Those of skill in the art will appreciate that various types of clutch elements could be employed, including sprag clutches, synchronizers, mechanical diode clutches and roller/ramp clutches. In the particular example provided, the clutch element 64 comprises a wrap spring 140 that is mounted coaxially between the annular wall member 104 on the shaft member 60 and the coupling member 124 on the hub 62. The wrap spring 140 can be formed of wire and can comprise a first end 142, a second end 144, and a plurality of wire coils 146 that can extend axially between the first and second ends 142 and 144. The wire can have any appropriate cross-sectional shape, including a generally square or rectangular cross-sectional shape that can be configured to engage a clutch surface 150 formed on coupling member 124 of the hub 62. The wrap spring 140 can be wound in a manner such that the coils 146 of the wrap spring 140 can expand radially when rotary power is transmitted between the hub 62 and the shaft member 60 in the first rotational direction (i.e., as when rotary power is input to the crankshaft 22 via the pulley 130) and can contract radially when the shaft member 60 rotates in the first rotational direction relative to the hub 62 (i.e., as when the shaft member 60 is directly driven by a source or rotary power, such as the crankshaft 22 of an engine). If desired, a lubricant may be employed to lubricate the interface between the wrap spring 140 and the clutch surface 150, such as an oil (including "traction fluids"), grease, paste, film or coating. It will be appreciated that in some instances, it may be desirable to include one or more seals (not shown) between the several components, such as between the hub 62 and the pulley 130 or between the hub 62 and the shaft member 60, and/or between the hub 62 and the coil mount 70, for example, to inhibit the egress of the lubricant from the interior of the clutching unit 32 and/or to inhibit the ingress of dirt, debris and/or moisture into the interior of the clutching unit 32. Alternatively, one or more labyrinths may be formed between the several components to generate tortuous paths by which the lubricant would need to travel to exit the interior of the clutching unit 32 and by which dirt, debris and/or moisture would need to travel to enter the interior of the clutching unit 32.

In the example provided, a carrier 160 is employed to non-rotatably couple the first end 142 of the wrap spring 140 to the shaft member 60 and a spring support or thrust ring 164 is employed to couple the second end 144 of the wrap spring 140 to the hub 62.

The wrap spring 140 and the carrier 160 can be coupled to one another in a manner that is similar to the manner in which the wrap spring and the carrier are coupled to one another in FIGS. 13 and 14 of International Patent Application No. PCT/CA2009/001660, the related disclosure of which is hereby incorporated by reference. In brief, the carrier 160 can be an annular structure or cartridge onto which the wrap spring 140 is assembled. The carrier 160 can be formed of any desired material, such as an engineering nylon, and can define an aperture 170, a slot (not shown) and one or more lug recesses (not shown). The aperture 170 can be sized to receive the annular wall member 104 of the shaft member 60 therethrough such that the carrier 160 may be abutted axially against the annular flange 102. The slot can be configured to receive the first end 142 of the wrap spring 140 and to orient an axial end face 180 of the wire that forms the wrap spring 140 against a corresponding face 182 formed on a lug 184 that is coupled to the shaft member 60 for rotation therewith. The lug recess(es) can be employed to inhibit or limit rotational movement of the carrier 160 relative to the shaft member 60 and/or to position the carrier 160 such that the axial end face 180 will abut the face 182 on the lug 184. In the example provided, the shaft member 60 comprises a single lug 184 and the carrier 160 comprises a single mating lug recess that defines radially extending walls that are abutted against radially extending faces on the lug 184; the slot in the carrier 160 intersects one of the radially extending walls on the lug recess so that the axial end face 180 may be abutted directly against a corresponding radially extending face 182 on the lug 184. Configuration in this manner permits rotational energy collected by the wrap spring 140 to be transmitted axially through the first end 142 of the wrap spring 140 (i.e., in a direction along the longitudinal axis of the wire that forms the first end 142 of the wrap spring 140) such that at least a majority of the rotational energy transmitted between the wrap spring 140 and the hub 62 exits the wrap spring 140 through the axial end face 180. It will be appreciated, however, that the interface between the first end 142 of the wrap spring 140, the carrier 160 and the shaft member 60 can be configured somewhat differently than that which is shown in the drawings and heretofore described in this text and that these different configurations are nonetheless within the scope of the present disclosure. For example, the first end 142 of the wrap spring 140 could be configured to transmit all or a portion of the rotational energy to the carrier 160 and the carrier 160 can be configured to transmit rotary power to the shaft member 60.

A retaining ring 190 can be mounted on the annular wall member 104 on the shaft member 60 and can limit or inhibit movement of the carrier 160 in an axial direction away from the annular flange 102.

The thrust ring 164 can be generally similar to that which is disclosed in U.S. Provisional Patent Application No. 61/432,907, the disclosure of which is incorporated by reference as if fully set forth in detail herein. The thrust ring 164 can comprise a first spacer portion 200 and a second spacer portion 202. The first spacer portion 200 can be somewhat smaller in diameter than the clutch surface 150 and can abut the wrap spring 140 on a side opposite the carrier 160. The side of the first spacer portion 200 that abuts the wrap spring 140 can include a helical spacer ramp 206 that can match (and thereby directly abut) the wire that forms the wrap spring 140. If desired, the thrust ring 164 can include a feature that can receive the second end 144 of the wrap spring 140. In the particular example provided, the second end 144 is bent or hooked radially inwardly from the coils 146 at an approximately right angle; the second end 144 is received into a mating groove (not shown) that is formed in the thrust ring 164 to inhibit rotation of the thrust ring 164 relative to the second end 144 of the wrap spring 140. The second spacer portion 202 can be a sleeve onto which the coils 146 of the wrap spring 140 can be received. A bushing 210 may be received between the coils 146 of the wrap spring 140 and one or both of the second spacer portion 202 and the retaining ring 190 and can help to maintain the coils 146 in an orientation that is concentric about the rotational axis of the crankshaft 22.

In operation, the coil 72 is de-activated during operation of the engine such that rotational energy provided to the shaft member 60 and hub spacer 100 via the crankshaft 22 will cause corresponding rotation of the pulley 130. Since the decoupler 30 is configured to permit relative rotation of the hub 62 (and therefore the shaft member 60) relative to the pulley 130 in the first rotational direction, any drag input to the wrap spring 140 (either through the coils 146 or through an interaction between the output flange 122 of the hub 62, the input flange 92 of the armature 52, the thrust ring 164 and the second end 144 of the wrap spring 140), the coils 146 of the wrap spring 140 will tend to radially contract away from and out of engagement with the clutch surface 150 on the hub 62. Accordingly, the clutching unit 32 will not experience significant wear during operation of the engine.

When it is desired to input rotary power from the pulley 130 to the crankshaft 22, as when employing a generator or alternator to start the engine (i.e., a belt-alternator-starter or BAS system), the coil 72 can be activated or energized to generate a magnetic field that attracts the pole member 90 to thereby axially translate the armature 52. In the example provided, the armature 52 is translated in response to the energization of the coil 72 such that the input flange 92 on the armature 52 is in driving engagement with the output flange 122 on the hub 62. Since the thrust ring 164 is non-rotatably coupled to the armature 52 and since the second end 144 of the wrap spring 140 is non-rotatably coupled to the thrust ring 164, rotation of the armature 52 will cause the second end 144 of the wrap spring 140 to rotate with the hub 62 in the first rotational direction to thereby cause the coils 146 of the wrap spring 140 to radially expand into driving engagement with the clutch surface 150 on the hub 62 so that the hub 62 will be driven by the hub 62 through the clutch element 64. In this regard, rotary power is received into the wrap spring 140 via the coils 146 and is transmitted axially through the wire that forms the wrap spring 140 to the lug 184 on the shaft member 60. In this regard, the first end 142 of the wrap spring 140 pushes against the lug 184 to drive the shaft member 60 in the first rotational direction.

To provide idle-stop-accessory functionality, the coil 72 is de-activated when the starter/generator 20 (FIG. 1) is operated to provide rotary power to the belt 24 (FIG. 1) when the engine is not being operated. The belt 24 (FIG. 1) will drive the pulley 130. Since the decoupler 30 is configured to permit relative rotation of the hub 62 (and therefore the shaft member 60) relative to the pulley 130 in the first rotational direction, any drag input to the wrap spring 140 (either through the coils 146 or through an interaction between the output flange 122 of the hub 62, the input flange 92 of the armature 52, the thrust ring 164 and the second end 144 of the wrap spring 140), the coils 146 of the wrap spring 140 will tend to radially contract away from and out of engagement with the clutch surface 150 on the hub 62. Accordingly, the clutching unit 32 will not experience significant wear during the provision of the idle-stop-accessory function.

If desired, a friction material 250 may be coupled to one or both of the output flange 122 and the input flange 92 to increase the performance associated with the rotational coupling of the armature 52 to the hub 62.

Figure 5:
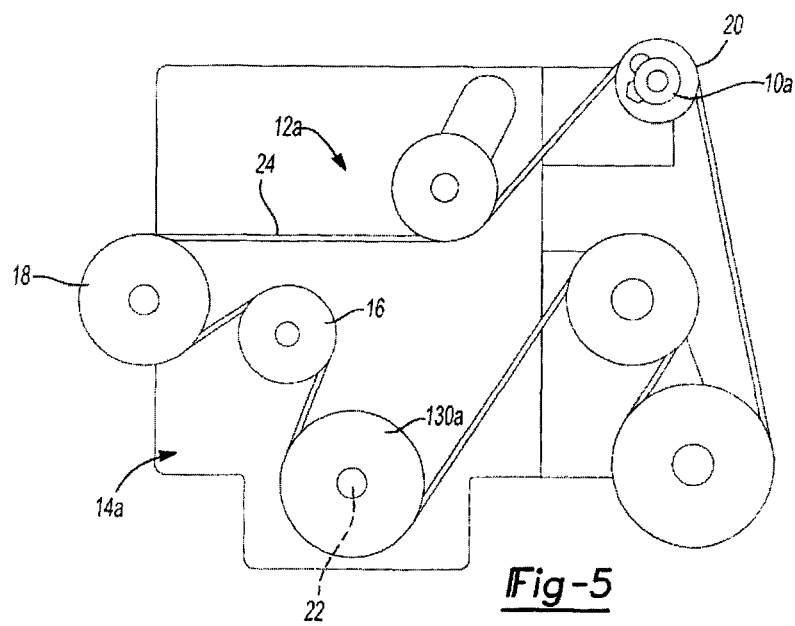
FIG. 5 is a schematic illustration of a second exemplary clutch controlled decoupler constructed in accordance with the teachings of the present disclosure and shown in operative association with an internal combustion engine.

With reference to FIG. 5 of the drawings, a second clutch controlled decoupler constructed in accordance with the teachings of the present disclosure is generally indicated by reference numeral 10a. The clutch controlled decoupler 10a can be employed in a front engine accessory drive 12a of an internal combustion engine 14a. The front engine accessory drive 12a can include a plurality of engine accessories, such as a water pump 16, an air conditioning compressor 18 and a starter/generator or starter/starter/generator 20 that can be driven by the crankshaft 22 of the engine 14 via a belt 24 and a crankshaft pulley 130a.

Figure 6:
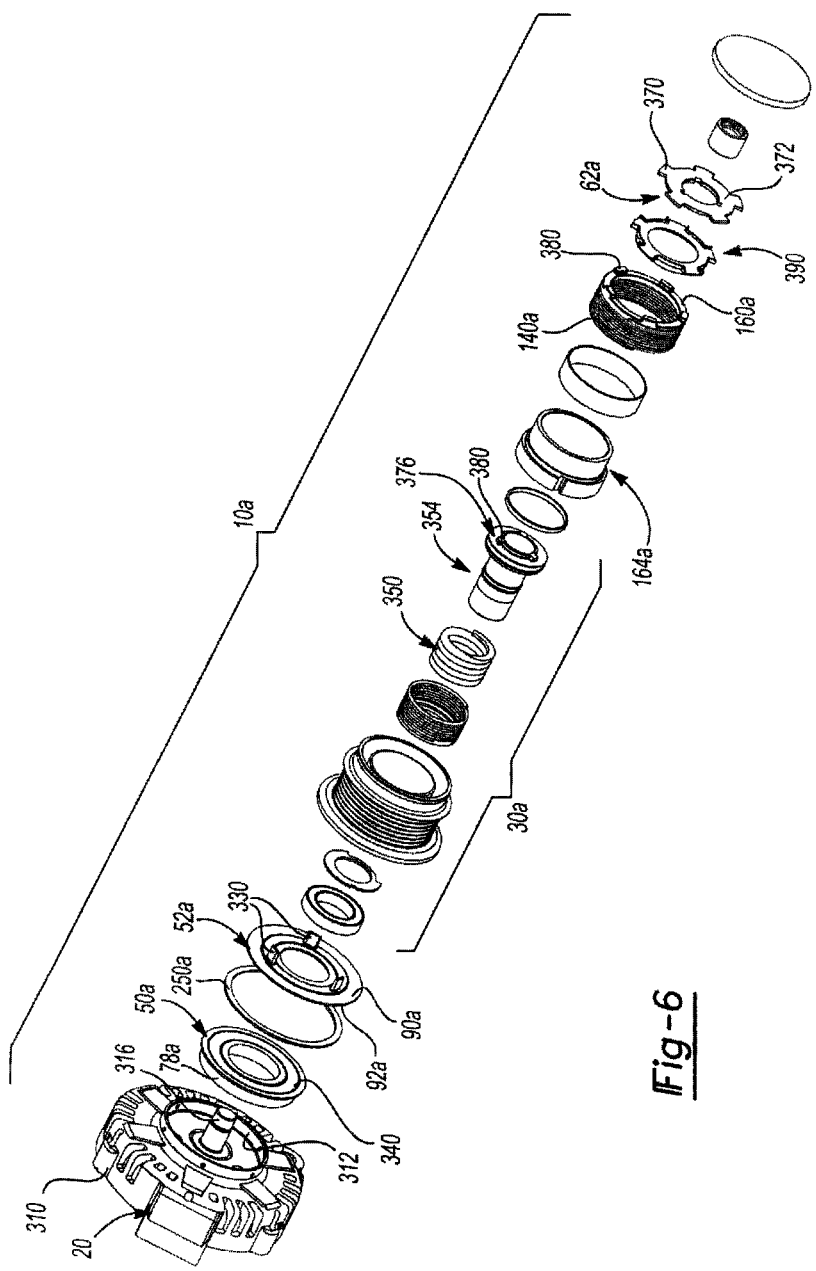
FIG. 6 is an exploded perspective view of the clutch controlled decoupler of FIG. 5.
Figure 7:
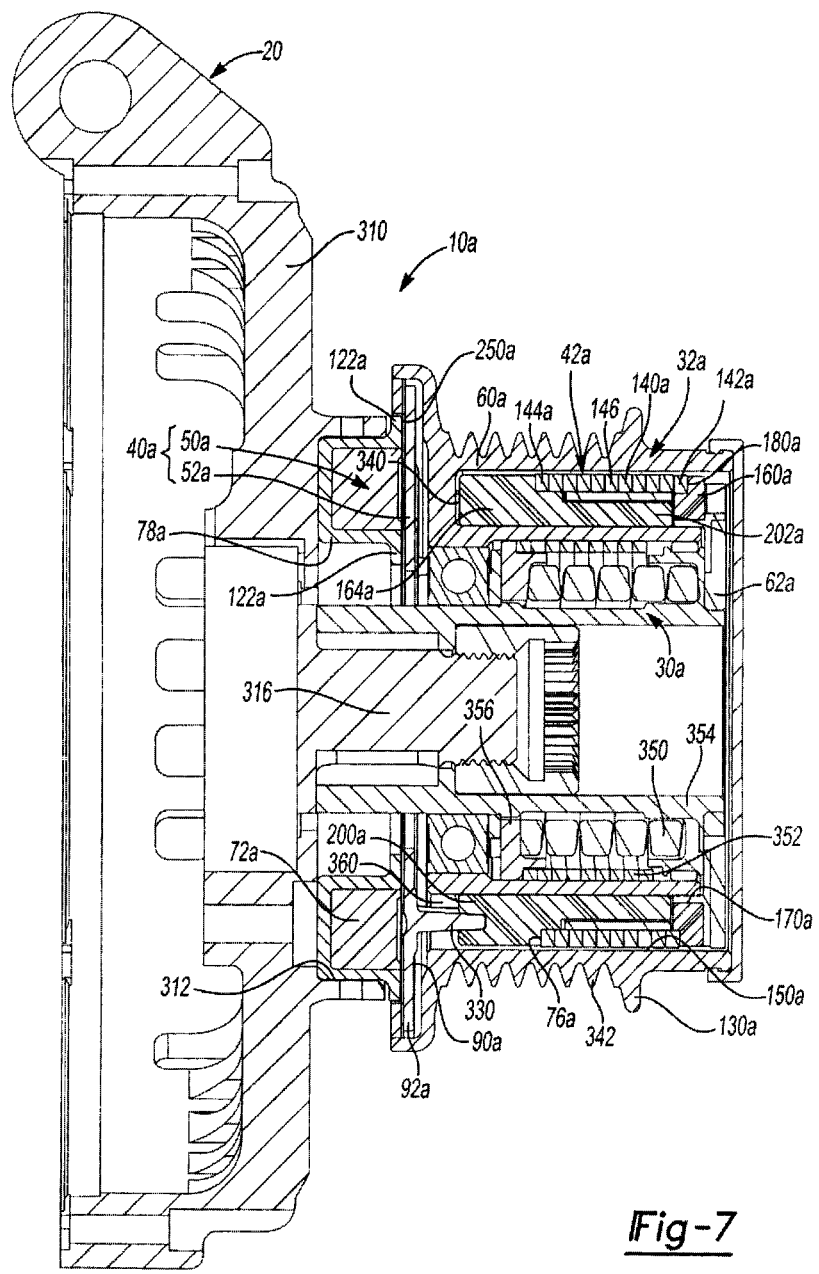
FIG. 7 is a perspective longitudinal section view of the clutch controlled decoupler of FIG. 5.

With reference to FIGS. 6 and 7, the clutch controlled decoupler 10a can comprise a decoupler 30a and a clutching unit 32a. Except as described herein, the decoupler 30a can be generally similar to the decoupler disclosed in International Patent Application No. PCT/CA2009/001803, but it will be appreciated that the decoupler 30a could be similar to any other suitable decoupler, including those which are described in U.S. Pat. Nos. 7,618,337 and 7,591,357. The disclosures of the aforementioned patent application and patents are incorporated by reference as if fully set forth in detail herein.

The clutching unit 32a can comprise an actuator 40a and a clutch assembly 42a. The actuator 40a can comprise a coil assembly 50a and an armature 52a, while the clutch assembly 42a can include an output member 60a, an input member 62a, and a clutch element 64a.

The coil assembly 50a can comprise a coil mount 70a and an annular coil 72a. The coil mount 70a can comprise an annular coil housing 78a that can be coupled to a housing 310 of an alternator or starter/generator 20. In the particular example provided, the coil housing 78a is received into a bore 312 that is formed in the housing 310. The coil 72a can be received in the coil housing 78a and can be positioned radially outwardly from a shaft 316 of the starter/generator 20.

The armature 52a can be formed of a magnetically susceptible material, such as steel, and can comprises an annular pole member 90a, an input flange 92a, which can extend radially outwardly from the pole member 90a, and a plurality of legs 330 that can extend axially from the pole member 90a so as to be concentrically disposed about the shaft 316 of the starter/generator 20.

The coil housing 78a can be constructed in a manner that is generally similar to that which is described in International Patent Application No. PCT/CA2010/001246, the disclosure of which is incorporated by reference. More specifically, the coil housing 78a can define a flange 122a that can be configured to frictionally engage the armature 52a to resist rotation of the armature 52a relative to the housing 310 of the starter/generator 20. If desired, a friction material 250a may be coupled to one or both of the flange 122a and the input flange 92a to increase the performance associated with engagement of the input flange 92a to the flange 122a.

The output member 60a can be coupled to or integrally formed with the pulley 130a of the decoupler 30a. In the example provided, the output member 60a comprises a clutch surface 150a that is formed on the pulley 130a of the decoupler 30a. The clutch surface 150a can be defined by an annular groove 340 in the pulley 130a of the decoupler 30a that can be disposed radially between the (belt) grooves 342 on the exterior of the pulley 130a and the internal components of the decoupler 30a, including the torsion spring 350, the clutch spring 352, the hub 354, and the spring carrier 356. A plurality of apertures 360 can be formed through the rear end of the pulley 130a and can intersect the annular groove 340. The legs 330 of the armature 52a can be received through the apertures 360 into the groove 340.

The input member 62a of the clutch assembly 42a can be fixedly coupled to the hub 354 of the decoupler 30a. In the particular example provided, the input member 62a of the clutch assembly 42a is an annular structure having one or more lugs or driver tabs 370 that extend radially outwardly from an annular body 372. The annular body 372 can be received onto a necked down portion 376 on the hub 354 on a side opposite the torsion spring 350 of the decoupler 30a. One or more of the driver tab(s) 370 can be engaged against a corresponding input tab 380 formed on the hub 354 to facilitate the transmission of rotary power from the hub 354 to the input member 370 as will be described in more detail, below.

The clutch element 64a can be configured to transmit rotary power from the input member 62a to the output member 60a and to inhibit the transmission of rotary power from the output member 60a to the input member 62a (i.e., the clutch element 64a can be configured to permit the transmission of rotary power between the input member 62a and the output member 60a in a first rotational direction and to inhibit the transmission of rotary power between the input member 62a and the output member 60a in a second, opposite rotary direction). Those of skill in the art will appreciate that various types of clutch elements could be employed, including sprag clutches, synchronizers, mechanical diode clutches and roller/ramp clutches. In the particular example provided, the clutch element 64a comprises a wrap spring 140a that is mounted coaxially between the (belt) grooves 342 on the pulley 130a and the internal components of the decoupler 30a, including the torsion spring 350, the clutch spring 352, the hub 354, and the spring carrier 356. The wrap spring 140a can be formed of wire and can comprise a first end 142a, a second end 144a, and a plurality of wire coils 146a that can extend axially between the first and second ends 142a and 144a. The wire can have any appropriate cross-sectional shape, including a generally square or rectangular cross-sectional shape that can be configured to engage the clutch surface 150a formed on the output member 60a. The wrap spring 140a can be wound in a manner such that the coils 146a of the wrap spring 140a can expand radially when rotary power is transmitted between the input member 62a and the output member 60a in the first rotational direction (i.e., as when the starter/generator 20 is employed as a motor for starting the engine 14a (FIG. 5) through the front engine accessory drive 12a (FIG. 5) and can contract radially when the output member 60a rotates in the first rotational direction relative to the input member 62a (i.e., as when rotary power is input to the alternator via a belt drive). If desired, a lubricant may be employed to lubricate the interface between the wrap spring 140a and the clutch surface 150a, such as an oil (including "traction fluids"), grease, paste, film or coating.

In the example provided, a carrier 160a is employed to non-rotatably couple the first end 142a of the wrap spring 140a to the input member 62a and a thrust ring 164a is employed to couple the second end 144a of the wrap spring 140a to the legs 330 of the armature 52a.

The wrap spring 140a and the carrier 160a can be coupled to one another in a manner that is similar to the manner in which the wrap spring and the carrier are coupled to one another in FIGS. 13 and 14 of International Patent Application No. PCT/CA2009/001660, the related disclosure of which is hereby incorporated by reference. In brief, the carrier 160a can be an annular structure or cartridge onto which the wrap spring 140a is assembled. The carrier 160a can be formed of any desired material, such as an engineering nylon, and can define an aperture 170a, a slot (not shown) and one or more lugs 380. The aperture 170a can be sized to permit the carrier 160a to be received into the groove 340 in the pulley 130a so that the carrier 160a may be abutted against the input member 62a. The slot can be configured to receive the first end 142a of the wrap spring 140a and to orient an axial end face 180a of the wire that forms the wrap spring 140a against a corresponding face (not specifically shown) of one of the driver tabs 370 on the input member 62a. In the example provided, the input member 62a comprises a plurality of driver tabs 370, and the carrier 160a comprises a plurality of lugs 380 that are abutted in a circumferential direction against the driver tabs 370.

Configuration in this manner permits at least a majority of the rotational energy transmitted from the hub 354 to the input member 62a to be transmitted to the wire of the wrap spring 140a directly through the axial end face 180a of the first end 142a of the wrap spring 140a; this rotational energy can be transmitted to the pulley 130a through the plurality of coils 146a of the wrap spring 140a as will be discussed in more detail below. It will be appreciated, however, that the interface between the first end 142a of the wrap spring 140a, the carrier 160a and the input member 62a can be configured somewhat differently than that which is shown in the drawings and heretofore described in this text and that these different configurations are nonetheless within the scope of the present disclosure. For example, the carrier 160a could be configured to receive all or a portion of the rotational energy from the input member 62a, and the carrier 160a could be configured to transmit this rotational energy to the first end 142a of the wrap spring 140a.

One or more bushings 390 can be employed to control the concentricity of the carrier 160a about a rotational axis of the shaft 316 of the starter/generator 20, as well as to limit forward axial movement of the carrier 160a relative to the shaft 316.

The thrust ring 164a can be generally similar to that which is disclosed in U.S. Provisional Patent Application No. 61/432,907, the disclosure of which is incorporated by reference as if fully set forth in detail herein. The thrust ring 164a can comprise a first spacer portion 200a and a second spacer portion 202a. The first spacer portion 200a can be somewhat smaller in diameter than the clutch surface 150a and can abut the wrap spring 140a on a side opposite the carrier 160a. The side of the first spacer portion 200a that abuts the wrap spring 140a can include a helical spacer ramp 76a that can match (and thereby directly abut) the wire that forms the wrap spring 140a. If desired, the thrust ring 164a can include a feature that can receive the second end 144a of the wrap spring 140a. In the particular example provided, the second end 144a is bent or hooked radially inwardly from the coils 146a at an approximately right angle; the second end 144a is received into a mating groove (not shown) that is formed in the thrust ring 164a to inhibit rotation of the thrust ring 164a relative to the second end 144a of the wrap spring 140a. The second spacer portion 202a can be a sleeve onto which the coils 146a of the wrap spring 140a can be received.

In operation, the coil 72a is de-activated during operation of the starter/generator 20 in a first or electric power generating mode in which rotational energy is transmitted from a belt drive (not shown) into the pulley 130a for driving the shaft 316. Since the clutching unit 32a is configured to permit relative rotation of the output member 60a (and therefore the pulley 130a) relative to the input member 62a (and therefore the hub 502) in the first rotational direction, any drag input to the wrap spring 140a during operation of the starter/generator 20 in the first mode will cause the coils 146a of the wrap spring 140a to radially contract away from and out of engagement with the clutch surface 150a on the output member 60a. Accordingly, the clutching unit 32a will not experience significant wear during operation of the starter/generator 20 in the first mode.

When it is desired to operate the alternator in a second mode that provides a rotary output to the belt drive via the pulley 130a, (i.e., as for providing rotary power for the starting of an internal combustion engine in a belt-alternator-starter or BAS system), the coil 72a can be activated or energized to generate a magnetic field that attracts the pole member 90a to thereby axially translate the armature 52a. In the example provided, the armature 52a is translated in response to the energization of the coil 72a such that the input flange 92a on the armature 52a frictionally engages the flange 122a on the coil housing 78a to thereby resist rotation of the armature 52a relative to the shaft 316 of the starter/generator 20. Simultaneously, operation of the starter/generator 20 in the second mode will cause rotation of the shaft 316, thereby causing rotation of the input member 62a, which in turn introduces rotational energy into the wrap spring 140a that would tend to cause the coils 146a of the wrap spring 140a to enlarge in a radial direction (to thereby drivingly engage the clutch surface 150a on the output member 60a). Since the thrust ring 164a is non-rotatably coupled to the armature 52a and since the second end 144a of the wrap spring 140a is non-rotatably coupled to the thrust ring 164a, operation of the coil 72a to cause the armature 52a to resist rotation will correspondingly impede rotation of the second end 144a of the wrap spring 140a. Non-rotation or impeded rotation of the second end 144a of the wrap spring 140a relative to the first end 142a of the wrap spring 140a ensures that torsion will be transmitted through the wrap spring 140a to a degree that causes the coils 146a of the wrap spring 140a to drivingly engage the clutch surface 150a to thereby transmit rotary power that is received from the input member 62a to the output member 60a (and thereby to the pulley 130a). As will be appreciated, rotational energy received by the wrap spring 140a from the input member 62a can be transmitted axially through the first end of the wrap spring 140a to the plurality of coils 146a, and through a plurality of the coils 146a to the clutch surface 150a.

Figure 8:
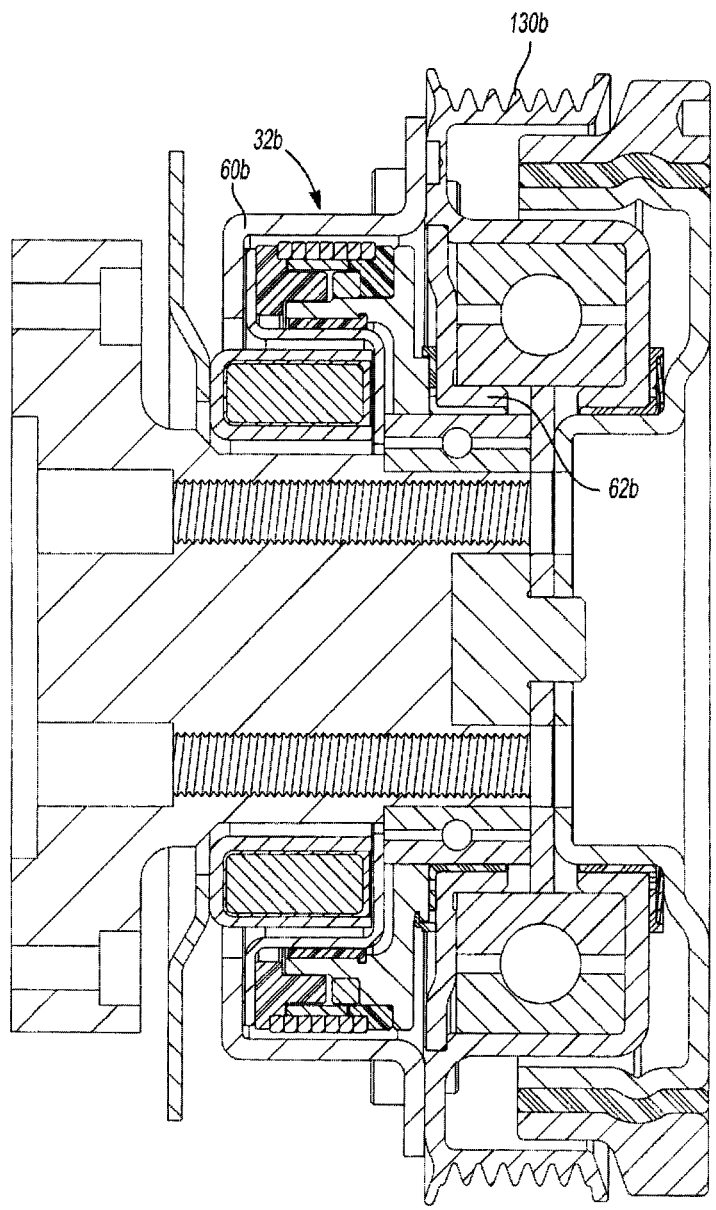
FIG. 8 is a perspective longitudinal section view of a driven accessory with a clutch unit constructed in accordance with the teachings of the present disclosure.

It will be appreciated that the clutching unit 32 (FIG. 2) of the present disclosure can have various other uses, including as a selectively operable clutch for operating an engine accessory. With reference to FIG. 8, a clutching unit 32b is illustrated in operative association with an engine accessory, such as a cooling fan. The clutching unit 32b can be generally similar to that which is described in FIG. 1, with the input member 60b being coupled to the cooling fan pulley 130b for rotation therewith and the output member 62b being coupled to the cooling fan (not shown).

It will also be appreciated from this disclosure that the clutch unit 32 (FIG. 2) may be incorporated into various other devices. For example, the clutch unit 32 (FIG. 2) could be substituted for the clutch assembly that is disclosed in one or more of the examples described in International Patent Application No. PCT/CA2009/001660, the disclosure of which is incorporated by reference.

As noted above, various different types of one-way clutches could be employed in lieu of the wrap spring clutch that is depicted in the above examples. With reference to FIGS. 9 through 11, a second clutch controlled decoupler constructed in accordance with the teachings of the present disclosure is generally indicated by reference numeral 10b. The clutch controlled decoupler 10b is generally similar to the clutch controlled decoupler 10 of FIG. 2 except that a roller clutch is substituted for the wrap spring clutch that is employed in the above-described example. The roller clutch 500 can include a hub 502, a cage 504, a plurality of cylindrical rollers 506, a shaft 508, an armature 510, a friction liner 512 and a coil assembly 50b that can be fixedly and non-rotatably coupled to the structure of an engine structure, such as an engine cover (not shown). The hub 502 can be coupled for rotation with the pulley 130 of the decoupler 30b and can include a plurality of outer tracks or raceways 520. Each outer track 520 can have a first track portion 522 and a second track portion 524. The cage 504 can define a plurality of holders 526, each of which being configured to receive an associated one of the rollers 506. The shaft 508 can include a shaft portion 530 and a flange 532. The shaft portion 530 can be non-rotatably coupled to the crankshaft (not shown) of an engine (not shown), while the flange 532 can be coupled to the cage 504 in a manner that permits limited rotational movement of the cage 504 relative to the flange 532. In the particular example provided, the cage 504 includes a plurality of legs 534 that extend through slotted apertures 536 formed through the flange 532. A thrust bearing 538 can be received between the flange 532 and the hub 502. The rollers 506 can be received in the holders 526 and can engage the outer tracks 520 and the shaft portion 530. Rotation of the cage 504 relative to the hub 502 can move the rollers 506 between the first and second track portions 522 and 524. When the rollers 506 are in the first track portions 522, the rollers 506 permit relative rotation between the shaft portion 550 and the hub 502. When the rollers 506 are in the second track portions 524, the rollers 506 are wedged between the hub 502 and the shaft portion 530 to thereby inhibit relative rotation between the hub 502 and the shaft portion 530.

The friction liner 512 can be an annular structure that can be fixedly and non-rotatably coupled to the legs 534 of the cage 504. The friction liner 512 can be slidably received on the shaft portion 530 between the armature 510 and the flange 532. The armature 510 can be axially slidably but non-rotatably mounted on the coil assembly 50b. The armature 510 can be moved in an axial direction by operation of the coil assembly 50b. In the particular example provided, the coil assembly 50b can be operated to drive the armature 510 away from the coil assembly 50b and to frictionally engage the friction liner 512 to the legs 534 to create a drag force that can cause the cage 504 to rotate relative to the hub 502 so that the rollers 506 are moved from the first track portion 522 to the second track portion 524. It will be appreciated that the friction liner 512 could be biased by a spring (not shown), such as a leaf spring, into or out of engagement with the legs 534.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

| Listing of Elements | |
|---|---|
| clutch controlled decoupler | 10 |
| clutch controlled decoupler | 10a |
| clutch controlled decoupler | 10b |
| engine accessory drive | 12 |
| engine accessory drive | 12a |
| engine | 14 |
| engine | 14a |
| water pump | 16 |
| air conditioning compressor | 18 |
| starter/generator | 20 |
| crankshaft | 22 |
| belt | 24 |
| decoupler | 30 |
| decoupler | 30a |
| decoupler | 30b |
| clutching unit | 32 |
| clutching unit | 32a |
| clutching unit | 32b |
| actuator | 40 |
| actuator | 40a |
| clutch assembly | 42 |
| clutch assembly | 42a |
| coil assembly | 50 |
| coil assembly | 50a |
| coil assembly | 50b |
| armature | 52 |
| armature | 52a |
| shaft member | 60 |
| output member | 60a |
| input member | 60b |
| hub | 62 |
| input member | 62a |
| clutch element | 64 |
| clutch element | 64a |
| coil mount | 70 |
| coil mount | 70a |
| coil | 72 |
| coil | 72a |
| annular flange | 76 |
| spacer ramp | 76a |
| coil housing | 78 |
| coil housing | 78a |
| front cover | 80 |
| front hub | 82 |
| pole member | 90 |
| pole member | 90a |
| input flange | 92 |

-continued

| Listing of Elements | |
|---|---|
| input flange | 92a |
| spacing member | 94 |
| hub spacer | 100 |
| annular flange | 102 |
| annular wall member | 104 |
| torsional vibration damper | 106 |
| holes | 110 |
| first bearing element | 116 |
| mounting flange | 120 |
| output flange | 122 |
| flange | 122a |
| coupling member | 124 |
| pulley | 130 |
| pulley | 130a |
| pulley | 130b |
| wrap spring | 140 |
| wrap spring | 140a |
| first end | 142 |
| first end | 142a |
| second end | 144 |
| second end | 144a |
| wire coils | 146 |
| wire coils | 146a |
| clutch surface | 150 |
| clutch surface | 150a |
| carrier | 160 |
| carrier | 160a |
| thrust ring | 164 |
| thrust ring | 164a |
| aperture | 170 |
| aperture | 170a |
| axial end face | 180 |
| axial end face | 180a |
| face | 182 |
| lug | 184 |
| retaining ring | 190 |
| first spacer portion | 200 |
| first spacer portion | 200a |
| second spacer portion | 202 |
| second spacer portion | 202a |
| spacer ramp | 206 |
| bushing | 210 |
| friction material | 250 |
| friction material | 250a |
| housing | 310 |
| bore | 312 |
| shaft | 316 |
| legs | 330 |
| annular groove | 340 |
| belt grooves | 342 |
| torsion spring | 350 |
| clutch spring | 352 |
| hub | 354 |
| spring carrier | 356 |
| apertures | 360 |
| driver tabs | 370 |
| annular body | 372 |
| input tab | 380 |
| bushing | 390 |
| roller clutch | 500 |
| hub | 502 |
| cage | 504 |
| rollers | 506 |
| shaft | 508 |
| armature | 510 |
| friction liner | 512 |
| outer tracks | 520 |
| first track portion | 522 |
| second track portion | 524 |
| holders | 526 |
| shaft portion | 530 |
| flange | 532 |
| legs | 534 |
| slotted apertures | 536 |
| thrust bearing | 538 |

What is claimed:

1. A clutched device comprising:
a pulley;
a shaft member;
a first one-way clutch having a first wrap spring; and
an actuator having an electromagnetic coil and an armature;
wherein the first one-way clutch rotationally couples the pulley and the shaft member when the actuator is actuated and rotary power is transmitted from a first one of the pulley and the shaft member to the other one of the pulley and the shaft member in a first rotational direction; and
wherein a frictional force is applied to the armature when the actuator is activated, the frictional force being configured to resist rotation of the armature to cause the first wrap spring to radially expand into driving engagement with a clutch surface that is coupled to the pulley for common rotation.

2. The clutched device of claim 1, further comprising a second one-way clutch, wherein the second one-way clutch rotationally couples the pulley and the shaft member when rotary power is transmitted from the other one of the pulley and the shaft member to the one of the pulley and the shaft member in the first rotational direction.

3. The clutched device of claim 2, wherein the second one-way clutch comprises a second wrap spring.

4. The clutched device of claim 1, wherein a bushing is received radially between the shaft member and the armature such that the bushing abuts the shaft member and the armature.

5. The clutched device of claim 1, wherein the first one-way clutch further comprises a carrier that couples a first axial end of the first wrap spring to the shaft member.

6. The clutched device of claim 5, wherein the first one-way clutch further comprises a thrust ring that is disposed on a second axial end of the first wrap spring, the thrust ring abutting the armature.

7. The clutched device of claim 1, wherein the first and second one-way clutches axially overlap one another.

8. The clutched device of claim 1, wherein the first one-way clutch is disposed concentrically about the second one-way clutch.

9. The clutched device of claim 1, further comprising a vibration damper coupled to the shaft member for rotation therewith.

10. The clutched device of claim 1, further comprising an isolation spring positioned to transfer torque from said other one of the pulley and the shaft member towards said first one of the pulley and the shaft member in the first rotational direction when the actuator is not activated.

11. The clutched device of claim 10, further comprising a second one-way clutch, wherein the second one-way clutch rotationally couples the pulley and the shaft member for torque transfer through the isolation spring when rotary power is transmitted from the other one of the pulley and the shaft member to the one of the pulley and the shaft member in the first rotational direction when the actuator is not activated.

12. A clutched device comprising:
a pulley;
a shaft member;
a first one-way clutch having a first wrap spring; and
an actuator having an electromagnetic coil and an armature;
wherein the first one-way clutch rotationally couples the pulley and the shaft member when the actuator is actuated and rotary power is transmitted from a first one of the pulley and the shaft member to the other one of the pulley and the shaft member in a first rotational direction; and wherein a frictional force is applied to the armature when the actuator is activated, the frictional force being configured to resist rotation of the armature to cause driving engagement of the first wrap spring with a clutch surface that is coupled to the pulley for common rotation with the pulley.

* * * * *